United States Patent
James

(12) 
(10) Patent No.: US 6,446,379 B1
(45) Date of Patent: Sep. 10, 2002

(54) FISHING POLE HOLDING ASSEMBLY

(76) Inventor: Herbert James, Loraine, OH (US)

( * ) Notice: Subject to any disclaimer, the term of this patent is extended or adjusted under 35 U.S.C. 154(b) by 13 days.

(21) Appl. No.: 09/658,413

(22) Filed: Sep. 8, 2000

(51) Int. Cl.⁷ .......................... A01K 97/10; A01K 97/12
(52) U.S. Cl. ............................................. 43/17; 43/21.2
(58) Field of Search ............................ 43/17, 21.2, 15, 43/16

(56) References Cited

U.S. PATENT DOCUMENTS

| | | | | |
|---|---|---|---|---|
| 2,641,079 A | * | 6/1953 | Oster | 43/17 |
| 2,817,176 A | * | 12/1957 | Harshbarger | 43/17 |
| 3,389,489 A | * | 6/1968 | Burns | 43/17 |
| 3,546,805 A | * | 12/1970 | Schaeffer | 43/17 |
| 3,646,698 A | | 3/1972 | Zachae | |
| 3,670,443 A | * | 6/1972 | Federline | 43/17 |
| 3,780,466 A | * | 12/1973 | Hadnot | 43/17 |
| 4,004,365 A | * | 1/1977 | Manchester | 43/17 |
| 4,125,957 A | * | 11/1978 | Cunningham | 43/17 |
| 4,479,322 A | * | 10/1984 | Koppel | 43/21.2 |
| 4,523,403 A | * | 6/1985 | Ivy et al. | 43/17 |
| 4,964,233 A | | 10/1990 | Benson et al. | |
| 5,033,223 A | | 7/1991 | Minter | |
| 5,050,332 A | * | 9/1991 | Cross | 43/15 |
| 5,050,333 A | * | 9/1991 | Debreczeni | 43/17 |
| 5,331,761 A | | 7/1994 | Kuthy | |
| 5,345,708 A | | 9/1994 | Loyd | |
| 5,524,376 A | * | 6/1996 | Flisak | 43/15 |
| D372,956 S | | 8/1996 | Mills | |
| D393,690 S | | 4/1998 | Lovelady et al. | |

* cited by examiner

Primary Examiner—Kurt Rowan

(57) ABSTRACT

A fishing pole holding assembly for easy storage and use. The fishing pole holding assembly includes a front support member that has a connecting bar. A back support member that is designed for holding handles of a pair of fishing poles is coupled to the front support member by a pair of connecting portions. A rod support member that is designed to hold rods of a pair of fishing poles is pivotally coupled to the connecting bar of the front support member. A biasing member is used for biasing a force exerted on the rod support member. The biasing member is coupled between the rod support member and the front support member.

18 Claims, 2 Drawing Sheets

FISHING POLE HOLDING ASSEMBLY

BACKGROUND OF THE INVENTION

1. Field of the Invention

The present invention relates to fishing pole holding devices and more particularly pertains to a new fishing pole holding assembly for easy storage and use.

2. Description of the Prior Art

The use of fishing pole holding devices is known in the prior art. More specifically, fishing pole holding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,033,223; U.S. Pat. No. Des. 372,956; U.S. Pat. No. 5,345,708; U.S. Pat. No. 393,690; U.S. Pat. No. 4,964,233; and U.S. Pat. No. 5,331,761.

While these devices fulfill their respective, particular objectives and requirements, the aforementioned patents do not disclose a new fishing pole holding assembly. The inventive device includes a front support member that has a connecting bar. A back support member that is designed for holding handles of a pair of fishing poles is coupled to the front support member by a pair of connecting portions. A rod support member that is designed to hold rods of a pair of fishing poles is pivotally coupled to the connecting bar of the front support member. A biasing member is used for biasing a force exerted on the rod support member. The biasing member is coupled between the rod support member and the front support member.

In these respects, the fishing pole holding assembly according to the present invention substantially departs from the conventional concepts and designs of the prior art, and in so doing provides an apparatus primarily developed for the purpose of easy storage and use.

SUMMARY OF THE INVENTION

In view of the foregoing disadvantages inherent in the known types of fishing pole holding devices now present in the prior art, the present invention provides a new fishing pole holding assemblyconstruction wherein the same can be utilized for easy storage and use.

The general purpose of the present invention, which will be described subsequently in greater detail, is to provide a new fishing pole holding assembly apparatus and method which has many of the advantages of the fishing pole holding devices mentioned heretofore and many novel features that result in a new fishing pole holding assembly which is not anticipated, rendered obvious, suggested, or even implied by any of the prior art fishing pole holding devices, either alone or in any combination thereof.

To attain this, the present invention generally comprises a front support member that has a connecting bar. A back support member that is designed for holding handles of a pair of fishing poles is coupled to the front support member by a pair of connecting portions. A rod support member that is designed to hold rods of a pair of fishing poles is pivotally coupled to the connecting bar of the front support member. A biasing member is used for biasing a force exerted on the rod support member. The biasing member is coupled between the rod support member and the front support member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing pole holding assembly apparatus and method which has many of the advantages of the fishing pole holding devices mentioned heretofore and many novel features that result in a new fishing pole holding assembly- which is not anticipated, rendered obvious, suggested, or even implied by any of the prior art fishing pole holding devices, either alone or in any combination thereof.

It is another object of the present invention to provide a new fishing pole holding assembly which may be easily and efficiently manufactured and marketed.

It is a further object of the present invention to provide a new fishing pole holding assembly which is of a durable and reliable construction.

An even further object of the present invention is to provide a new fishing pole holding assembly which is susceptible of a low cost of manufacture with regard to both materials and labor, and which accordingly is then susceptible of low prices of sale to the consuming public, thereby making such fishing pole holding assemblyeconomically available to the buying public.

Still yet another object of the present invention is to provide a new fishing pole holding assembly which provides in the apparatuses and methods of the prior art some of the advantages thereof, while simultaneously overcoming some of the disadvantages normally associated therewith.

Still another object of the present invention is to provide a new fishing pole holding assembly for easy storage and use.

Yet another object of the present invention is to provide a new fishing pole holding assembly which includes a front support member that has a connecting bar. A back support member that is designed for holding handles of a pair of fishing poles is coupled to the front support member by a pair of connecting portions. A rod support member that is designed to hold rods of a pair of fishing poles is pivotally coupled to the connecting bar of the front support member. A biasing member is used for biasing a force exerted on the rod support member. The biasing member is coupled between the rod support member and the front support member.

Still yet another object of the present invention is to provide a new fishing pole holding assembly that alerts a user if a fish strikes.

Even still another object of the present invention is to provide a new fishing pole holding assembly that provides a place to store beverages.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
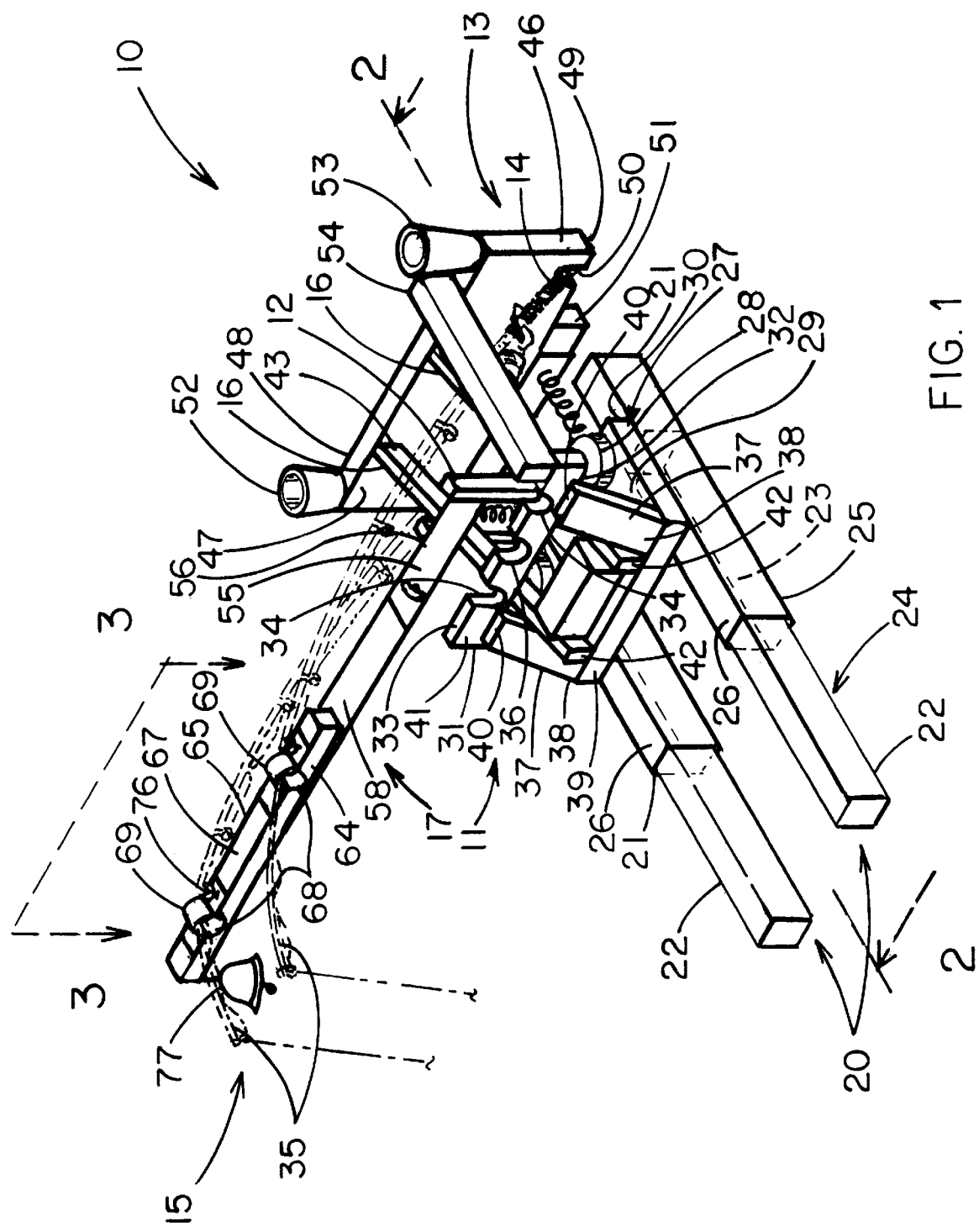
FIG. 1 is a schematic perspective view of a new fishing pole holding assembly according to the present invention.
Figure 2:
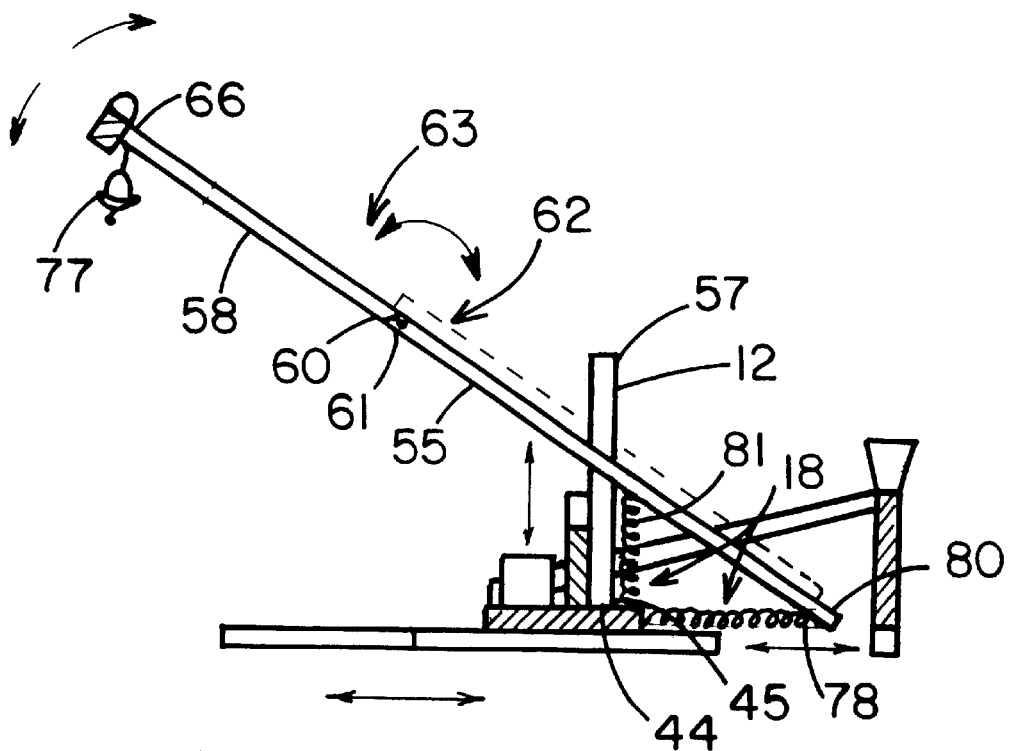
FIG. 2 is a schematic cross-sectional side view of the present invention
Figure 3:
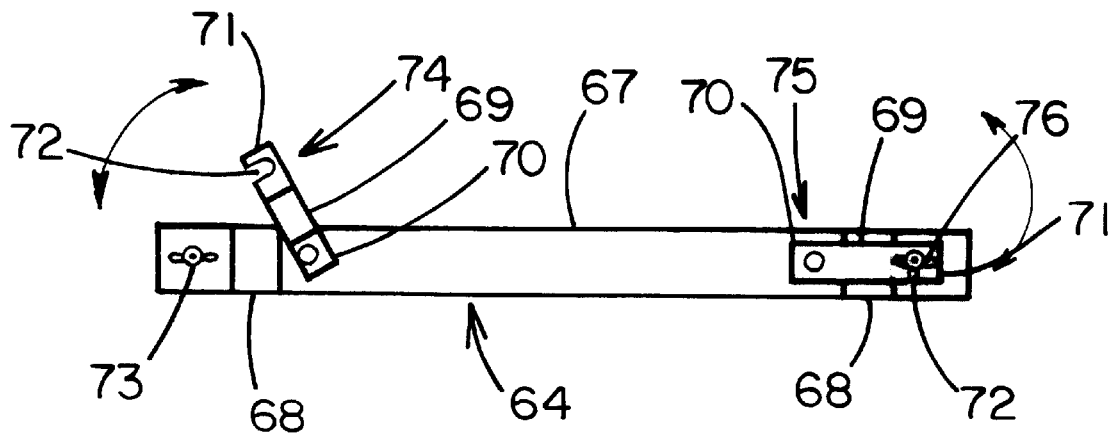
FIG. 3 is a schematic top view of the cross bar of the present invention.

With reference now to the drawings, and in particular to FIGS. 1 through 3 thereof, a new fishing pole holding assembly embodying the principles and concepts of the present invention and generally designated by the reference numeral 10 will be described.

As best illustrated in FIGS. 1 through 3, the fishing pole holding assembly 10 generally comprises a front support member 11 that has a connecting bar 12. A back support member 13 that is designed for holding handles 14 of a pair of fishing poles 15 is coupled to the front support member 11 by a pair of connecting portions 16. A rod support member 17 that is designed to hold the rods 35 of a pair of fishing poles 15 is pivotally coupled to the connecting bar 12 of the front support member 11. A biasing member 18 is used for biasing a force exerted on the rod support member 17. The biasing member 18 is coupled between the rod support member 17 and the front support member 11.

In closer detail, the front support member 11 includes a pair of leg members 20. Each leg member 20 has a first leg portion 21 and a second leg portion 22. The second leg portion 22 is extendably received in the first leg portion 21. Moreover, each second leg portion 22 has a stored position 23 and a use position 24. The stored position 23 is defined when the second leg portion 22 is totally received in the first leg portion 21. The use position 24 is defined when the second leg portion 22 extends a predetermined distance from the first leg portion 21.

The leg members 20 have a bottom leg surface 25 that is designed to engage a surface upon which the front support member 11 is placed. The leg members 20 also having a top leg surface 26. Moreover, the leg members 20 are positioned parallel to each other at a predetermined spaced distance.

The front support member 11 includes a support platform 27. The support platform 27 is coupled across the top leg surface 26 of the first leg portions 21 of the leg members 20. A pair of support disks 28 are coupled to a top side 29 of the support platform 27. The support disks are positioned proximate a back end 30 of the support platform 27. The support disks 26 are spaced a predetermined distance apart from each other.

The front support member 11 also includes a rod guide portion 31. The rod guide portion 31 has a bottom end 32 that is coupled across the front support disks 26. The rod guide portion 31 further has a top end 33. The top end 33 of the rod guide portion 31 has a pair of arcuate rod depressions 34 designed to engage an associated rod 35 when pressure is exerted on the rod 35. The rod depressions 34 are spaced at a predetermined distance from each other. The top end 33 further has an arcuate medial depression 36 that is adapted to engage the rod support member 17 when pressure is exerted on the rod support member 17. The medial depression 36 is positioned in between the rod depressions 34.

The front support member further includes a pair of front supporting portions 37 for supporting the rod guide portion 31. Each front supporting portion 37 have a first end 38 coupled to the top side 29 of the support platform 27 adjacent a front end 39 of the support platform 27. Each front supporting portions 37 further has a second end 40. The second end 40 of the front supporting portions 37 are coupled to a front face 41 of the rod guide portion 31. In addition, the front supporting portions 37 are positioned parallel with each other at a predetermined spaced distance.

Each connecting portion 16 has a first end 42. The first end 42 of each connecting portion 16 is coupled to the top side 29 of the support platform 27 adjacent the front end 39 of the support platform 27. In addition, each connecting portion 16 extends across the support platform 27 at a predetermined angle relative to the top side 29 of the support platform 27. Each connecting portion 16 has a second end 43 that extends beyond the back end 30 of the support platform 27 a predetermined distance. The connecting portions 16 are further positioned parallel with each other at a predetermined spaced distance apart.

The connecting bar 12 of the front support member has a first end 44 coupled to a medial portion 45 of the top side 29 of the support platform 27 proximate the back end 30 of the support platform 27.

The back support member 13 includes a main back portion 46. The main back portion 46 is generally rectangular box shaped. The second ends 43 of the connecting portions 16 of the front support member 11 are coupled to a front side 47 of the main back portion 46 adjacent a top end 48 of the main back portion 46. The main back portion 46 also has a bottom end 49. The bottom end 49 has a pair of arcuate back depressions 50. The back depressions 50 are spaced a predetermined distance apart from each other.

The back support member 13 further includes a back surface support portion 51 for engaging a surface upon which the back support member 13 is placed. The back surface support portion 51 is coupled to the bottom end 49 of the main back portion 46 in between the back depressions 50. In addition, a support bar 54 for providing extra support is coupled across the top end 33 of the rod guide portion 31 and the top end 48 of the main back portion 46.

A cup holder 52 for holding a beverage container is coupled to the top end 48 of the main back portion 46. Moreover, A bait holder 53 for holding bait is also coupled to the top end 48 of the back portion 46.

The rod support member 17 further includes an elongated first arm 55. The first arm 55 has a medial portion 56 that is pivotally coupled to the connecting bar 12 proximate a second end 57 of the connection bar 12. The rod support member 17 further includes an elongated second arm 58. The second arm 58 has a first end 60 that is pivotally coupled to a second end 61 of the first arm 55. The second arm 58 has a stored position 62 and a use position 63. The stored position 62 is defined when the second arm 58 is pivotally positioned adjacent the first arm 55. The use position 63 is defined when the second arm 58 extents along a longitudinal axis of the first arm 55.

The rod support member 17 further includes a cross bar 64. A medial portion 65 of the cross bar 64 is coupled to a second end 66 of the second arm 58. The cross bar 64 has an upper surface 67. The upper surface 67 has a pair of arcuate cross depressions 68 for receiving the rods 35 of the fishing poles 15. The cross depressions 68 are spaced a predetermined distance apart from each other.

A pair of brackets 69 are used to hold the rods 35 of the fishing poles 15 in the cross depressions 68. Each bracket 69 has a first end 70 pivotally coupled to the upper surface 67 of the cross bar 64 adjacent an associated cross depression 68. Each bracket 69 further has a second end 71. The second end 71 has a cutout track portion 72. The upper surface 67 of the cross bar 64 has a threaded rod 73 extending therefrom. The cutout track portion 72 in the second end 71 of the bracket 69 is designed to engage the threaded rod 73.

Each bracket 69 has an open position 74 and a closed position 75. The open position 74 is defined when the bracket 69 is pivoted away from an associated cross depression 68. The closed position 75 is defined when the bracket 69 is positioned over an associated cross depression 68 and the cutout track portion 72 in the bracket 69 is engaged with the associated threaded rod 73. A pair of wing nuts 76 are used to securing each bracket 69 in its closed position 75. Each wing nut 76 is designed to engage an associated threaded rod 73.

A bell 77 is used for alerting a user if the fishing pole 15 has a fish on. The bell 77 is coupled to the cross bar 64. Thus when the cross bar 64 is moved the bell 77 rings.

The biasing member 19 includes a first spring 78. The first spring 78 is connected between a first end 80 of the first arm 55 and the back end 30 of the support platform 27. The biasing member 19 further includes a second spring 81. The second spring 81 is connected between the medial portion 56 of the first arm 55 and the top side 29 of the support platform 27.

In addition, a tackle box 82 for holding a quantity of fishing tackle is coupled to the top side 29 of the support platform 27 adjacent the front end 39 of the support platform 27. The tackle box 82 further is positioned in between the connecting portions 37.

In use, the second leg portions 22 are extended into their use position 24. The second arm 58 is then pivoted in its use position 63. A pair of fishing poles 15 are then placed in the fishing pole holding assembly 10. Each handle 14 of the fishing poles 15 are engaged in an associated handle depression 50 in the main back portion 46. The rods 35 of the fishing poles 15 are then placed in an associated cross depression 68 in the cross bar 64. The rods 35 are then locked into place with the brackets 69 and wing nuts 76. The fishing pole holding assembly 10 is then ready for use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the enact construction and operation shown and described, and accordingly, all suitable modifications and equivalents may be resorted to, falling within the scope of the invention.

I claim:

1. A fishing pole holding assembly comprising:
 a front support member, the front support member including a connecting bar;
 a back support member, said back support member being adapted for holding handles of a pair of fishing poles, said back support member being coupled to said front support member by a pair of connecting portions;
 a rod support member, said rod support member being adapted for holding Rods of said fishing poles, said rod support member being pivotally coupled to said connecting bar of said front support member;
 a biasing member for biasing a force exerted on said rod support member, said biasing member being coupled between said rod support member and said front support member;
 said rod support member including an elongated first arm and an elongated second arm;
 said first arm having a medial portion, said medial portion of said first arm being pivotally coupled to said connection bar proximate a second end of said connection bar;
 said second arm having a first end, said first end of said second arm being pivotally coupled to a second end of said first arm; and
 said second arm having a stored position and a use position, said stored position being defined when said second arm is pivotally positioned adjacent said first arm, said use position is defined when said second arm extents along a longitudinal axis of said first arm.

2. The fishing pole holding assembly of claim 1, said front support member further comprising:
 a pair of leg members, said leg members having a bottom leg surface for engaging a surface upon which said front support member is placed, said leg members also having a top leg surface, said leg members further being parallel to each other at a predetermined distance.

3. The fishing pole holding assembly of claim 2 further comprising:
 each said leg member having a first leg portion, each said leg member further having a second leg portion, said second leg portion being extendably received in said first leg portion; and said second leg portion having a stored position and a use position, said stored position being defined when said second leg portion is totally received in said first leg portion, said use position being defined when said second leg portion extends a predetermined distance from said first leg portion.

4. The fishing pole holding assembly of claim 1, said rod support member further comprising:
   a cross bar, a medial portion of said cross bar being coupled to a second end of said second arm; and
   said cross bar having a upper surface, said upper surface having a pair of arcuate cross depressions each for receiving said rods of said fishing poles, said cross depressions being spaced a predetermined distance apart from each other.

5. The fishing pole holding assembly of claim 4 further comprising:
   a pair of brackets for holding said rods of said fishing poles in said cross depressions, each said bracket having a first end pivotally coupled to said upper surface of said cross bar adjacent a said associated cross depression, each bracket further having a second end, said second end having a cutout track portion, said upper surface of said cross bar having a threaded rod extending therefrom, said cutout track portion in said second end of said bracket being adapted to engage said threaded rod; and
   each said bracket having a open position and a closed position, said open position being defined when said bracket is pivoted away from associated said cross depression, said closed position being defined when said bracket is positioned over said associated cross depression and said cutout track portion in said bracket is engaged with said associated threaded rod.

6. The fishing pole holding assembly of claim 5 further comprising:
   a pair of wing nuts for securing each said bracket in said closed position, each said wing nut being adapted to selectively engage an associated said threaded rod.

7. The fishing pole assembly of claim 1, said biasing member further comprising:
   a first spring, said first spring being connected between a first end of said first arm and a back end of said support platform; and
   a second spring, said second spring being connected between said medial portion of said first arm and a top side of said support platform.

8. The fishing pole holding assembly of claim 1 further comprising:
   a bell for alerting a user if said fishing pole has a fish on, said bell being coupled to said rod support member.

9. A fishing pole holding assembly comprising:
   a front support member, the front support member including a connecting bar;
   a back support member, said back support member being adapted for holding handles of a pair of fishing poles, said back support member being coupled to said front support member by a pair of connecting portions;
   a rod support member, said rod support member being adapted for holding fishing poles, said rod support member being pivotally coupled to said connecting bar of said front support member;
   a biasing member for biasing a force exerted on said rod support member, said biasing member being coupled between said rod support member and said front support member;
   wherein said front support member includes a pair of leg members, said leg members having a bottom leg surface for engaging a surface upon which said front support member is placed, said leg members also having a top leg surface, said leg members further being parallel to each other at a predetermined distance;
   each said leg member having a first leg portion, each said leg member further having a second leg portion, said second leg portion being extendably received in said first leg portion;
   said second leg portion having a stored position and a use position, said stored position being defined when said second leg portion is totally received in said first leg portion, said use position being defined when said second leg portion extends a predetermined distance from said first leg portion;
   wherein said front support member includes a support platform, said support platform being coupled across said top leg surface of said first leg portions of said leg members; and
   said front support member including a pair of support disks, said support disks being coupled to a top side of said support platform proximate a back end of said support platform, said support disks being spaced a predetermined distance apart from each other.

10. The fishing pole holding assembly of claim 9, said front support member further comprising:
    a rod guide portion, said rod guide portion having a bottom end coupled across said front support disks, said rod guide portion having a top end, said top end having a pair of arcuate rod depressions adapted to engage an associated said rod when pressure is exerted on said rod, said rod depressions being spaced at a predetermined distance from each other; and
    said top end further having an arcuate medial depression adapted to engage said rod support member when pressure is exerted on said rod support member, said medial depression being positioned in between said rod depressions.

11. The fishing pole holding assembly of claim 10, said front support member further comprising:
    a pair of front supporting portions for supporting said rod guide portion, each said front supporting portions having a first end coupled to said top side of said support platform adjacent a front end of said support platform, each said front supporting portions further having a second end, said second end of said front supporting portions being coupled to a front face of said rod guide portion, said front supporting portions being parallel with each other at a predetermined spaced distance.

12. The fishing pole holding assembly of claim 9, said front support member further comprising:
    each said connecting portions having a first end, said first end of each connecting portion being coupled to a top side of said support platform adjacent a front end of said support platform; and
    each said connecting portion further extending across said support platform at a predetermined angle relative to said top side of said support platform, each said connecting portion having a second end extending beyond a back end of said support platform a predetermined distance; said connecting portions further being parallel with each other at a predetermined spaced distance.

13. The fishing pole holding assembly of claim 9, said front support member further comprising:
a connecting bar, said connecting bar having a first end coupled to a medial portion of said top side of said support platform proximate said back end of said support platform.

14. The fishing pole holding assembly of claim 10 further comprising:
a support bar for providing extra support, said support bar being coupled across said top end of said rod guide portion and a top end of said main back portion.

15. A fishing pole holding assembly comprising:
a front support member, the front support member including a connecting bar;
a back support member, said back support member being adapted for holding handles of a pair of fishing poles, said back support member being coupled to said front support member by a pair of connecting portions;
a rod support member, said rod support member being adapted for holding fishing poles, said rod support member being pivotally coupled to said connecting bar of said front support member;
a biasing member for biasing a force exerted on said rod support member, said biasing member being coupled between said rod support member and said front support member;
wherein said back support member includes a main back portion, said main back portion being generally rectangular box shaped, a second end of each said connecting portions of said front support member being coupled to a front side of said main back portion adjacent a top end of said main back portion;
said main back portion further having a bottom end, said bottom end having a pair of arcuate back depressions for holding said handles of said fishing poles, said back depressions being spaced a predetermined distance apart from each other; and
said back support member including a back surface support portion for engaging a surface upon which said back support member is placed, said back surface support portion being coupled to said bottom end of said main back portion in between said back depressions.

16. The fishing pole holding assembly of claim 15 further comprising:
a cup holder for holding a beverage container, said cup holder being coupled to a top end of said main back portion.

17. The fishing pole holding assembly of claim 15 further comprising:
a bait holder for holding bait, said bait holder being coupled to a top end of said back portion.

18. A fishing pole holding assembly comprising:
a front support member, said front support member including a pair of leg members, each said leg member having a first leg portion, each said leg member further having a second leg portion, said second leg portion being extendably received in said first leg portion;
said second leg portion having a stored position and a use position, said stored position being defined when said second leg portion is totally received in said first leg portion, said use position being defined when said second leg portion extends a predetermined distance from said first leg portion;
said leg members having a bottom leg surface for engaging a surface upon which said front support member is placed, said leg members also having a top leg surface, said leg members further being parallel to each other at a predetermined spaced distance;
said front support member including a support platform, said support platform being coupled across said top leg surface of said first leg portions of said leg members;
said front support member including a pair of support disks, said support disks being coupled to a top side of said support platform proximate a back end of said support platform, said support disks being spaced a predetermined distance apart from each other;
said front support member including a rod guide portion, said rod guide portion having a bottom end coupled across said front support disks, said rod guide portion having a top end, said top end having a pair of arcuate rod depressions adapted to engage an associated rod of a fishing pole when pressure is exerted on said rod, said rod depressions being spaced at a predetermined distance from each other;
said top end further having an arcuate medial depression, said medial depression being positioned in between said rod depressions;
said front support member including a pair of front supporting portions for supporting said rod guide portion, each said front supporting portions having a first end coupled to said top side of said support platform adjacent a front end of said support platform, each said front supporting portions further having a second end, said second end of said front supporting portions being coupled to a front face of said rod guide portion, said front supporting portions being parallel with each other at a predetermined spaced distance;
said front support member further including a pair of connecting portions, each said connecting portion having a first end, said first end of each connecting portion being coupled to said top side of said support platform adjacent said front end of said support platform;
each said connecting portion extending across said support platform at a predetermined angle relative to said top side of said support platform, each said connecting portion having a second end extending beyond said back end of said support platform a predetermined distance, said connecting portions further being parallel with each other at a predetermined spaced distance apart;
said front support member further including a connecting bar, said connecting bar having a first end coupled to a medial portion of said top side of said support platform proximate said back end of said support platform;
a back support member for holding a pair of handles of a pair of fishing poles, said back support member including a main back portion, said main back portion being generally rectangular box shaped, said second ends of said connecting portions of said front support member being coupled to a front side of said main back portion adjacent a top end of said main back portion;
said main back portion further having a bottom end, said bottom end having a pair of arcuate back depressions for holding said handles of said fishing poles, said back depressions being spaced a predetermined distance apart from each other;
said back support member including a back surface support portion for engaging a surface upon which said back support member is placed, said back surface support portion being coupled to said bottom end of said main back portion in between said back depressions;

a cup holder for holding a beverage container, said cup holder being coupled to said top end of said main back portion;

a bait holder for holding bait, said bait holder being coupled to said top end of said back portion;

a support bar for providing extra support, said support bar being coupled across said top end of said rod guide portion and said top end of said main back portion;

a rod support member for holding said rod of said fishing pole, said rod support member further including an elongated first arm, said first arm having a medial portion, said medial portion of said first arm being pivotally coupled to said connection bar proximate a second end of said connection bar;

said rod support member further including an elongated second arm, said second arm having a first end, said first end of said second arm being pivotally coupled to a second end of said first arm, said second arm having a stored position and a use position, said stored position being defined when said second arm is pivotally positioned adjacent said first arm, said use position is defined when said second arm extents along a longitudinal axis of said first arm;

said rod support member further including a cross bar, a medial portion of said cross bar being coupled to a second end of said second arm;

said cross bar having a upper surface, said upper surface having a pair of arcuate cross depressions each for receiving said rod of said fishing pole, said cross depressions being spaced a predetermined distance apart from each other;

a pair of brackets for holding said rods of said fishing poles in said cross depressions, each said bracket having a first end pivotally coupled to said upper surface of said cross bar adjacent an associated said cross depression, each bracket further having a second end, said second end having a cutout track portion, said upper surface of said cross bar having a threaded rod extending therefrom, said cutout track portion in said second end of said bracket being adapted to engage said threaded rod;

each said bracket having a open position and a closed position, said open position being defined when said bracket is pivoted away from associated said cross depression, said closed position being defined when said bracket is positioned over said associated cross depression and said cutout track portion in said bracket is engaged with said associated threaded rod;

a pair of wing nuts for securing each said bracket is said closed position, each said wing nut being adapted to selectively engage an associated said threaded rod;

a bell for alerting a user if said fishing pole has a fish on, said bell being coupled to said cross bar wherein when said cross bar is moved said bell will sound;

a biasing member for biasing a force exerted on said rod support member, said biasing member including a first spring, said first spring being connected between a first end of said first arm and said back end of said support platform; and said biasing member further including a second spring, said second spring being connected between said medial portion of said first arm and said top side of said support platform.

* * * * *